United States Patent [19]
Taubin

[11] Patent Number: 5,506,947
[45] Date of Patent: Apr. 9, 1996

[54] CURVE AND SURFACE SMOOTHING WITHOUT SHRINKAGE

[75] Inventor: Gabriel Taubin, Hartsdale, N.Y.

[73] Assignee: International Business Machines Corporation, Armonk, N.Y.

[21] Appl. No.: 310,820

[22] Filed: Sep. 22, 1994

[51] Int. Cl.$^6$ ................................................ G06T 5/00
[52] U.S. Cl. ........................ 395/133; 395/120; 395/123; 395/141
[58] Field of Search .................................. 395/133, 119, 395/120, 123, 125, 127–132, 139, 141–143; 382/254, 264, 266–269

[56] References Cited

U.S. PATENT DOCUMENTS

| | | | |
|---|---|---|---|
| 4,646,251 | 2/1987 | Hayes et al. | 395/123 |
| 5,257,203 | 10/1993 | Riley et al. | 395/139 |
| 5,357,600 | 10/1994 | Shirman et al. | 395/133 |

OTHER PUBLICATIONS

Paul Ning et al, An Evaluation of Implicit Surface Tilers, IEEE Computer Graphics & Applications, Nov. 1993, pp. 33–41.
Richard O. Duda et al, Pattern Classification and Scene Analysis, Wiley–Interscience Publication, John Wiley & Sons, pp. 291–297.
Mark Halstead et al, Efficient, Fair Interpolation using Catmull–Clark Surfaces, Computer Graphics Proceedings, Annual Conference Series, 1993, pp. 35–44.
B. K. P. Horn et al, Filtering Closed Curves, IEEE Transactions on Pattern Analysis and Machine Intelligence, vol. PAMI–8, No. 5, Sep. 1986, pp. 665–668.
M. Lounsbery et al, Parametric Surface Interpolation, IEEE Computer Graphics & Applications, Sep. 1992, pp. 45–52.
J. Oliensis, Local Reproducible Smoothing without Shrinkage, IEEE Transactions on Pattern Analysis and Machine Intelligence, vol. 15, No. 3, Mar. 1993, pp. 307–312.
D. Watson, Smoothing ISO–Surfaces Composed of Polygons, IBM Technical Disclosure Bulletin, vol. 34, No. 4B, Sep. 1991, p. 474.
James D. Foley et al, Representing Curves and Surfaces, Computer Graphics Principles and Practice, Second Edition, pp. 471–477, pp. 612–613, pp. 1034–1039, pp. 1083–1113.

*Primary Examiner*—Almis R. Jankus
*Attorney, Agent, or Firm*—Louis J. Percello; Ronald L. Drumheller

[57] ABSTRACT

The present invention smooths piece-wise linear shapes by defining neighborhoods of vertices around vertices of the shape. One or more vectors is defined between the vertex and each of its neighbors. Vector sums are alternately multiplied by one of two scale factors. The scale factors are opposite in sign with the negative scale factor of larger magnitude. The vertices of the shape are displaced by the multiplied vector sums to attain new positions. The process is repeated with the vertices moving back and forth approximately through their final position until the shape is smoothed without shrinkage.

18 Claims, 12 Drawing Sheets

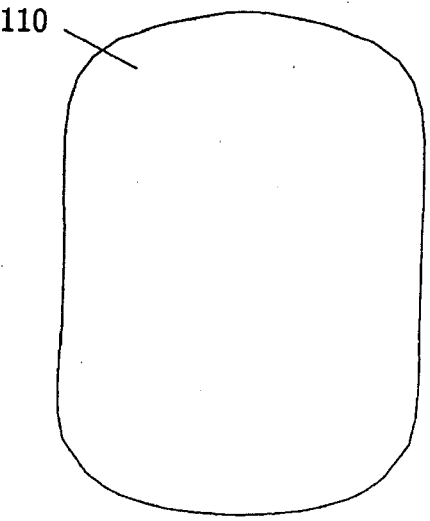 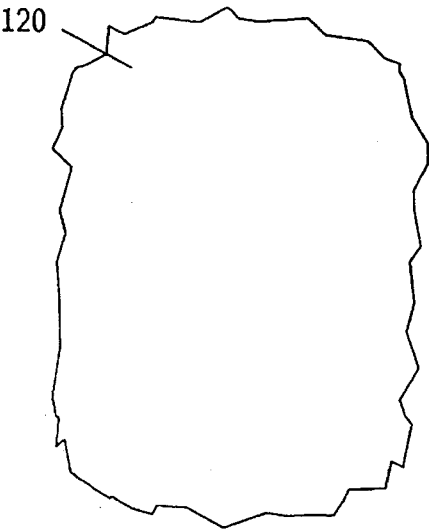
FIG. 1A
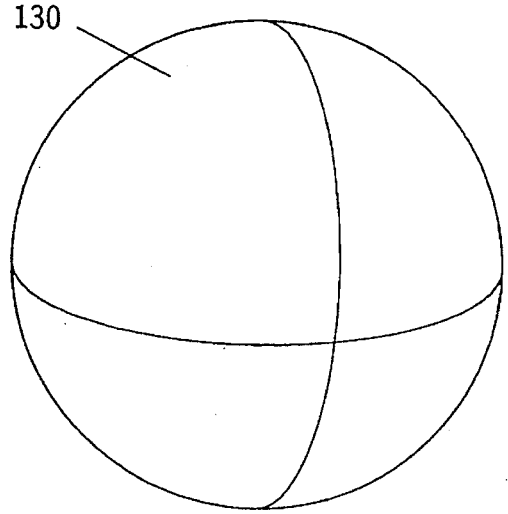 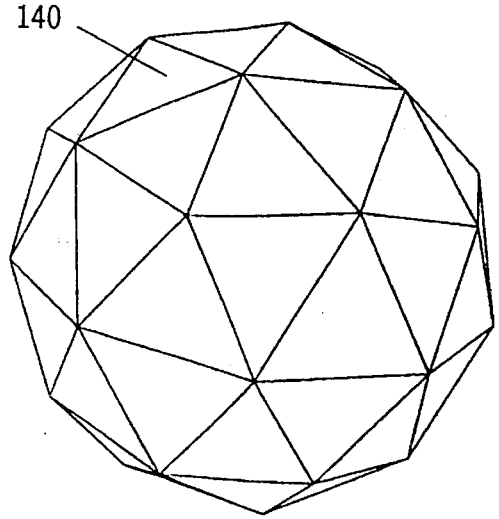
FIG. 1B

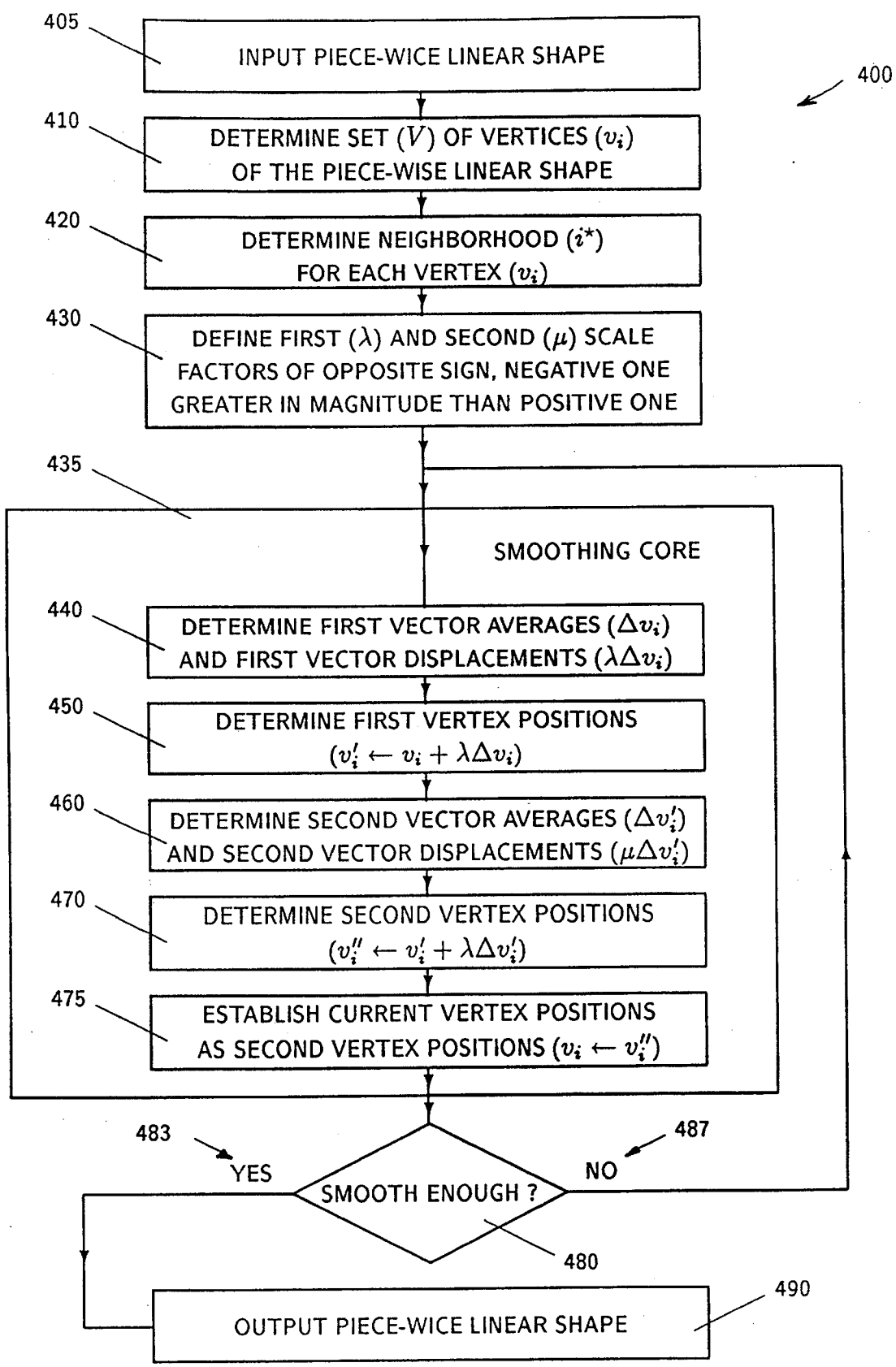

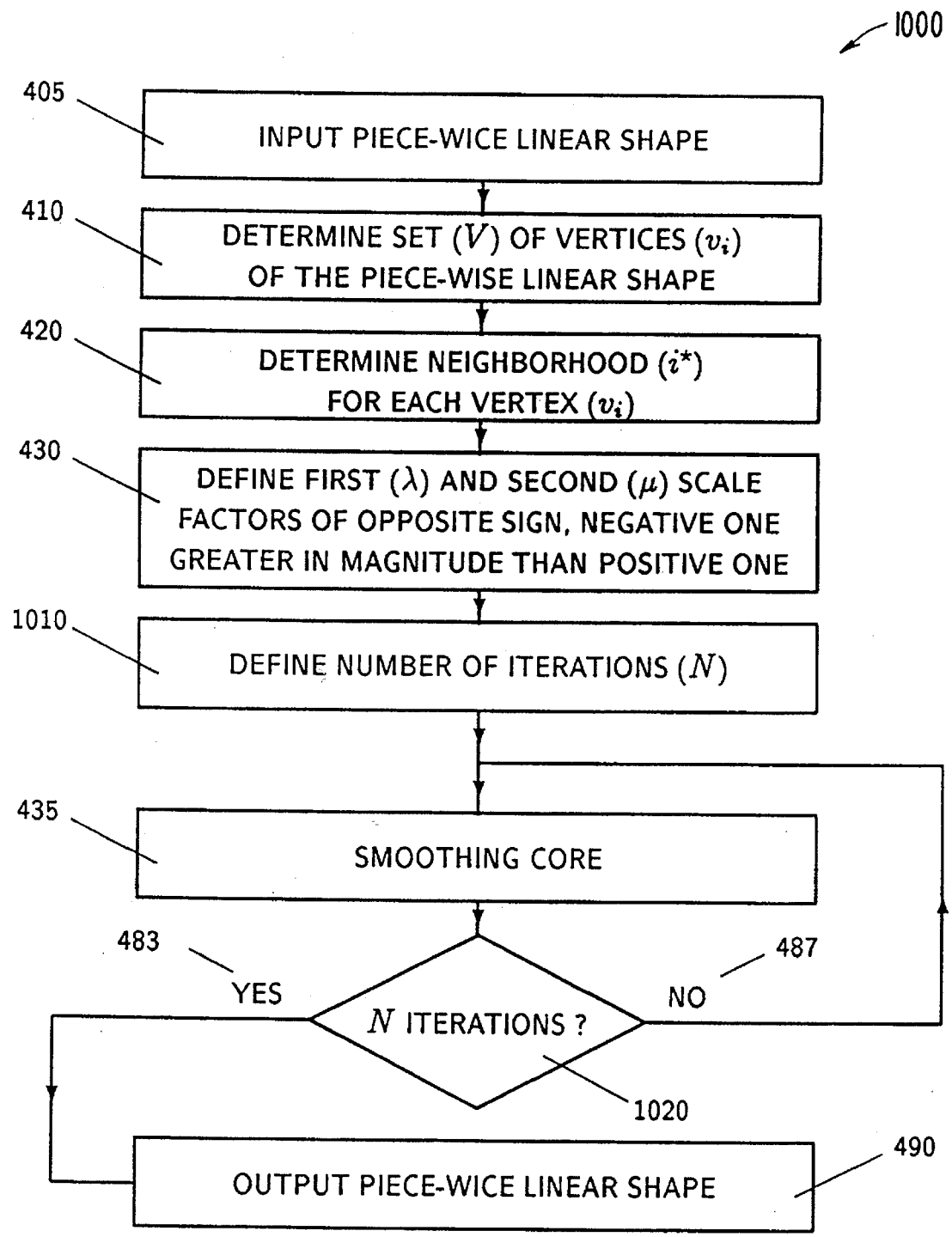

CURVE AND SURFACE SMOOTHING WITHOUT SHRINKAGE

FIELD OF THE INVENTION

This invention relates to a system and method for smoothing a curve or a surface without reducing the curve length or the surface area. More specifically, the invention relates to the field of smoothing curves or surfaces in computer graphics and image processing.

BACKGROUND OF THE INVENTION

For our purposes, curves and surfaces will be referred to as shapes, and polygonal curves and polyhedral surfaces will be referred to as piece-wise linear shapes, respectively.

In many applications, particularly in visualization of scientific data, and as intermediate steps within a number of other procedures, polygonal curve approximations of two and three dimensional curves, and polyhedral surface approximations of surfaces, are routinely determined. An inherent problem of these piece-wise linear approximation methods is that the resulting piece-wise linear shapes appear faceted. To reduce the apparent faceting, smoothing methods are used.

Smoothing methods are also used in the Computer Graphics and Geometric Modeling literature within the context of curve and surface design. Subdivision surfaces are designed as limits of sequences of polyhedral surfaces. Starting with an initial skeleton polyhedral surface, the next polyhedral surface in the sequence is obtained by subdividing all the faces of the current surface, and then applying a polyhedral surface smoothing step to the subdivided surface. The main problem with most of these surface design methods is that the limiting surface is significantly smaller in size than the initial skeleton surface. Subdivision curves are defined likewise and suffer the same problems.

Boundary-following and iso-surface construction algorithms are prior art examples of algorithms that produce these piece-wise linear approximations. In general, algorithms to compute piece-wise linear approximations of smooth curves and surfaces differ depending on how the original curve or surface is described. Among the most common descriptions, curves and surfaces can be described analytically by parametric or implicit equations.

The prior art recognizes that implicit curves and surfaces (i.e., those defined by implicit equations) are particularly difficult to approximate. Points of implicit curves and surfaces are determined by solving systems of equations. Alternatively, points of parametric curves are more easily obtained by substituting values for one parametric variable (parametric surfaces are defined by two variables) in a set of parametric equations.

Implicit and parametric curves and surfaces are defined by functions. Functions can be expressed as analytic formulas or as tables of values. When the functions are defined by tables of values, it may be necessary to determine intermediate values by interpolation. Boundary or contour following algorithms produce typical examples of two-dimensional parametric curves or surfaces that are defined by tables of values. These are curves extracted from digital images as the boundary curves of image regions. The table of values is constructed as the sequence of coordinates of the boundary vertices of the pixels visited while following the boundary of the region, which constitute a polygonal approximation of an underlying smooth curve. The state of the art in contour following algorithms was disclosed in the prior art by the year 1973.

An iso-surface construction algorithm computes a piece-wise linear approximation of an implicit surface from the table of values that the defining function attain on a regular three dimensional grid. The so-called marching cubes algorithm is one of the most widely known iso-surface construction algorithms, but there exists in the prior art a large family of closely related algorithms, which differ essentially in how they tessellate the volume defined by the grid of function values, and on how they interpolate function values between existing table values.

The main problem with almost all of these approximation algorithms is that, even though the underlying curve or surface is smooth, the resulting piece-wise linear shape appears faceted. This is so because, due to the discretization or interpolation processes, the location of points on the underlying curve or surface cannot be determined with high precision. FIG. 1 is a prior art example of piece-wise linear approximations of smooth curves and surfaces showing the faceting problem. A smooth curve approximation algorithm produces a faceted piece-wise linear approximation 120 of a smooth curve 110. A smooth surface approximation algorithm produces a faceted piece-wise linear approximation 140 of a smooth curve 130.

The prior art provides essentially two approaches to solve the smoothing problem regarding surfaces—visual smoothing and geometric smoothing. Visual smoothing uses variations of illumination to make piece-wise linear surfaces appear smooth without changing the surface. (This technique does not exist for curves.) Geometric smoothing modifies the geometry of the curve or surface to perform actual smoothing.

In visual smoothing, different illumination models and face shading algorithms can be used to produce a visually smoothing effect. Among these algorithms there are those that define the surface normal at a vertex of the polyhedral surface as a weighted average of the surface normals of the incident faces, and use these computed surface normals at the vertices to produce a smooth shading of the surface using the so-called Phong shading method, also known as normal-vector interpolation shading. Using these methods, the surface geometry is not modified, but just rendered in such a way that it looks smooth.

Visual smoothing methods are of no use when the surface approximation is determined with some other purpose in mind, such as for example, to locate points of high curvature or other geometric invariant features on the curve or surface for identification or registration applications, to measure curve length, surface area, area enclosed by a closed curve, or volume enclosed by a closed surface. In these cases the geometry of the polyhedral surface must be modified to achieve accurate results in the computations performed afterwards.

Most prior art geometric smoothing methods suffer from a number of problems. Perhaps the most important one is the shrinkage problem: when applied iteratively a large number of times, a shape eventually converges to its centroid. FIG. 2A illustrates the problem of shrinkage that most prior art smoothing algorithms have in the case of curves, and FIGS. 2B illustrates the same problem in the case of surfaces. FIG. 2 is a prior art example of the shrinkage problem. A shrinking piece-wise linear curve smoothing algorithm produces a smoother but smaller piece-linear curve 220 when applied to a piece-linear curve 210. A shrinking piece-wise linear surface smoothing algorithm produces a smoother but smaller piece-linear surface 240 when applied to a piece-linear surface 230.

In geometric smoothing, smoothing polygonal curves is simpler than smoothing polyhedral surfaces because curves have an intrinsic linear ordering. For a closed curve, the fact that each vertex has exactly two neighbors in the intrinsic ordering, one preceding it and the other following it, allows for the application of Fourier analysis. The so-called Fourier descriptors—the use of the coefficients in a Fourier series expansion of the tangent-angle versus arc-length description of a curve—provide a multi-resolution representation of continuous curves. To smooth a curve it is sufficient to truncate its Fourier series. However, the result is no longer a polygonal curve, but a smooth parametric curve defined by analytic equations. To obtain a new polygonal curve, the new continuous curve, the truncated Fourier series of the original curve, is sampled at regular intervals. Fourier descriptors date back to the early 1960's, and have been widely used since then in the computer vision literature as multi-resolution shape descriptors for object recognition. In practice, this continuous process is approximated by computing the Discrete Fourier Transform of the sequence of vertex coordinates, setting the coefficients of the transform associated with high frequencies to zero, and back transforming the resulting sequence.

The method of Fourier descriptions for curve smoothing does not have the shrinkage problem, but it is well known in the prior art that truncating the Fourier series of a function introduces an unwanted high frequency perturbation. This problem is known in the prior art as the Gibbs phenomenon. There are two other important problems with this method for smoothing polyhedral curves. First, it is rather computationally expensive. Even using the Fast Fourier Transform algorithm, the number of arithmetic operations is of the order of n log(n), where n is the number of vertices. Linear algorithms, those which require in the order of n arithmetic operations, are more desirable, particularly for surfaces, where the number of vertices is large. The second problem with the method of fourier descriptions is that it does not extend to surfaces of arbitrary topological type, but just to surfaces that can be parameterized with vector functions of two variables defined on a rectangular region. And even in these cases, the results are dependent on the particular parameterization used. In the case of curves the intrinsic order determines a canonical parameterization, the arc-length parameterization, but there is no such a thing in the case of surfaces.

Perhaps the most popular linear (the number of operations are proportional to the number faces, edges, or vertices of the piece-wise linear shape) technique of geometric smoothing parameterized curves is the so-called Gaussian filtering method. In the continuous case, Gaussian filtering is performed by convolving the vector function that parameterizes the curve with a Gaussian kernel. Gaussian filtering also extends to those surfaces that can be parameterized by functions of two variables defined on a rectangular domain, but not to surfaces of arbitrary topological type because there is not even a valid notion of convolution for general surfaces. Gaussian filtering is applied to images in this way, because images are modeled as graphs of functions of two variables. But it is well known though that Gaussian filtering has the difficulty that it produces shrinkage. Some heuristic solutions to this problem have been proposed, and more recently Oliensis presented a better analysis of the problem and an elegant solution. By looking at the filtered curve in the frequency domain, and because the Fourier transform of a convolution is the product of the Fourier transforms of the two factors, Oliensis showed that the shrinkage problem is a consequence on the fact that the Fourier transform of a Gaussian kernel, a Gaussian function itself, does not constitute a low-pass filter. Except for the zero frequency, all the frequencies are attenuated. Since an ideal low-pass filter has infinite support in the space domain, the problem is difficult to solve, but Oliensis proceeded to define a low-pass filter kernel that solves the problem. That is, convolution of a curve with this kernel produces smoothing without shrinkage. The main problem with this method is that it does not extend to surfaces of arbitrary topological type either, i.e., it only applies to surfaces where the neighborhood is defined by a rectangular grid. This is so mainly because of two reasons. First, although almost compact, the significant part of the support of the kernel must extend significantly far away from the current vertex to produce a significant smoothing effect. And second, based on the usual representation of a polyhedral surface as a list of vertices and a list of faces, it is very difficult to access vertices that are far away from a given vertex without building special purpose data structures. Furthermore, for a general surface the neighborhood structure changes from vertex to vertex, and so, a different kernel should be designed for each vertex, consuming a significant amount of storage. All of this is very impractical, both in terms of the number of arithmetic operations and in terms of the amount of storage required to encode all this information.

In the Computer Graphics and Geometric Modeling literature, surface smoothing is also called surface fairing, and is usually associated with patch technology. In this framework surface fairing is case as a smooth surface interpolation problem where each planar face of the initial polyhedral surface is replaced by a smooth parametric patch. Since algorithms in this group produce interpolating surfaces, they do not suffer from the shrinkage problem, but a significant amount of high curvature variation from the skeleton polyhedron might remain present in the resulting surfaces. That is, the problem of smoothing the skeleton polyhedral surface is not solved. In that sense, these methods are somehow like the visual smoothing methods described above. Furthermore, the resulting surfaces are no longer polyhedral, and so, cannot be compared with other geometric smoothing algorithms. More recently surface fairing has been formulated as a global nonlinear minimization problem on a polyhedral surface, with a number of degrees of freedom proportional to the number of vertices or faces of the surface. Some of these algorithms produce interpolating surfaces as well, but at the expense of a very high computational cost, and others do produce shrinkage.

The weighted averaging method is the simplest approximation of Gaussian smoothing for polygonal curves and polyhedral surfaces. In the weighted averaging method the new position of each vertex is computed as a weighted average of the current position of the vertex, and the current position of its first order neighbors, those vertices that share an edge (or face) with the current vertex. The weighted averaging method has a number of advantages with respect to the prior art discussed above, but still produces shrinkage. The first advantage is that it applies to polygonal curves and polyhedral surfaces of arbitrary topological type, not only those that can be parameterized by functions defined on a rectangular domain. The second advantage is that, since first order neighbors are defined implicitly in the list of edges or faces of the curve or surface, no storage is required to encode the neighborhood structures. The third advantage is that the number of operations is a linear function of the total number of vertices and faces.

OBJECTS OF THE INVENTION

In object of this invention is an improved system and method that has general application to smoothing all piece-wise linear curves or surfaces.

Another object of this invention is an improved system and method that has general application to smoothing piece-wise linear approximations of smooth curves or surfaces.

Another object of this invention is an improved system and method that smooths piece-wise linear curves (surfaces) without reducing the curve length (surface area).

Another object of this invention is an improved system and method that smooths piece-wise linear curves (surfaces) without reducing the curve length (surface area) in producing a computer image.

SUMMARY OF THE INVENTION

The present invention is a novel system and method for smoothing piece-wise linear curves (surfaces) by modifying the position of the vertices defining the shape. The invention produces a smoothing effect while preventing shrinkage, even when it is applied iteratively a large number of times. The invention applies to general and arbitrary polygonal curves, polyhedral surfaces, and more generally polytopes of arbitrary dimension. It produces a low-pass filter effect as a function of curvature. The invention achieves minimal computational cost, because the number of steps required is proportional to the number of vertices, edges, or faces of the curve or surface. It requires minimal storage for representing and encoding information about neighborhoods of vertices.

The present method begins by determining a set of vertices that define a piece-linear shape. Typically, these vertices define a piece-wise linear approximation of a curve (surface). Then for each given vertex defining the shape, a neighborhood of vertices near the vertex is selected. One or more first vectors is defined between the vertex and each of its neighbors. A first vector average is determined for each vertex by vector averaging the first vectors. A first vector displacement is then determined for each vertex by multiplying the first vector average by a first scale factor. Then a first position of each vertex is determined. The first position of the vertex is the position it attains if moved by the direction and magnitude of the first displacement vector. At this point, a second vector average is determined between each vertex and each of its neighbors by the same process. A second vector average is determined by vector averaging all the second vectors. A second vector displacement is then determined by multiplying the second vector average by a second scale factor. This second scale factor is opposite in sign than the first scale factor. The negative scale factor is also of greater magnitude than the positive scale factor. A second position of each vertex is then determined. The second position of the vertex is the position it attains if moved in the direction and magnitude of the second vector displacement. If the shape as defined by all the vertices in their second position is within certain smoothness criteria, the algorithm finishes. If not, the method is repeated starting with the step that determines the first vectors for each vertex.

The method can be run on a computer system to produce smooth images from the piece-wise linear curves and surfaces. In a preferred embodiment, the first (second) vector average is determined by weighting the first (second) vectors. In a more preferred embodiment, the weights are all positive and sum to the value 1.

BRIEF DESCRIPTION OF THE DRAWINGS

FIGS. 1, comprising FIG. 1A and FIG. 1B, is a prior art example of piece-wise linear approximations of smooth curves (FIG. 1A) and surfaces (FIG. 1B).

FIGS. 2, comprising

FIG. 4 is a flow chart showing the steps of the present smoothing algorithm.

FIGS. 5, comprising

FIG. 6, comprising

FIG. 7, comprising

FIG. 10 is a flow chart showing the steps of the present smoothing algorithm in a preferred embodiment of the smoothness criterion.

FIG. 11, comprising

DETAILED DESCRIPTION OF THE INVENTION

Figure 2A:
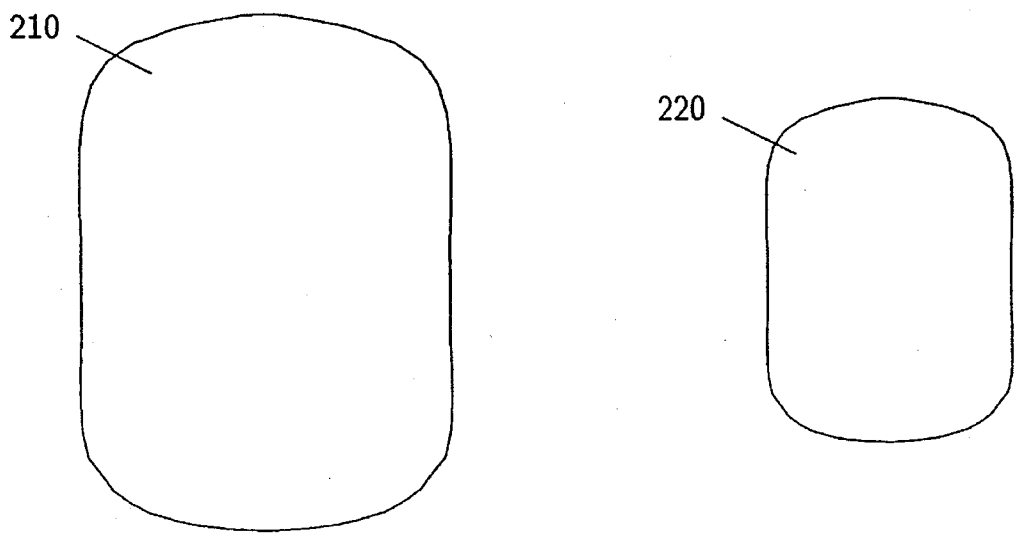
FIG. 2A and FIG. 2B, is a prior art examples of the shrinkage problem for curves (FIG. 2A) and surfaces (FIG. 2B).
Figure 2B:
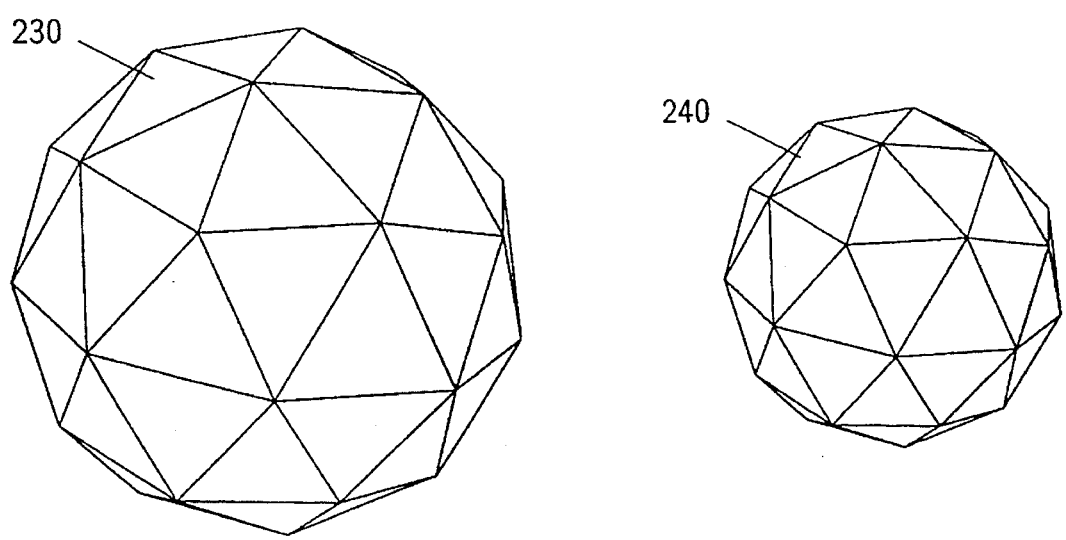
Figure 3:
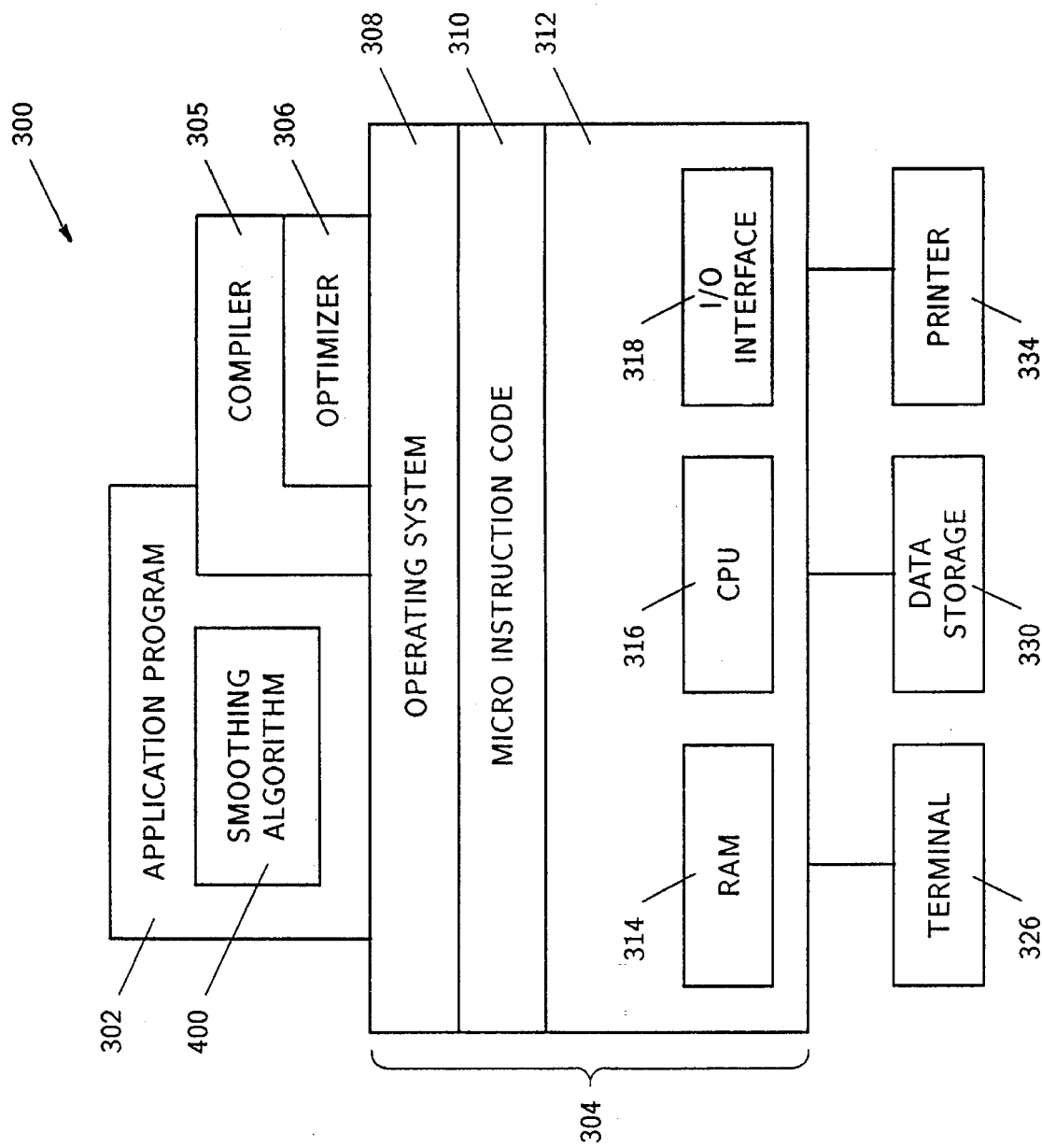
FIG. 3 is a block diagram of a typical computer system executing the present method.

FIG. 3 is a block diagram showing a computer system 300 on which a preferred embodiment of the present invention operates. The preferred embodiment includes one or more application programs 302. One type of application program 302 is a compiler 305 which includes an optimizer 306. The compiler 305 and optimizer 306 are configured to transform a source (like other application programs 302) program into optimized executable code. More generally, the source program is transformed to an optimized form and then into executable code. The compiler 305 and optimizer 306 operate on a computer platform 304 that includes a hardware unit 312. One application program 302 that runs on the system 300 is the present method 400.

The hardware unit 312 includes one or more central processing units (CPU) 316, a random access memory (RAM) 314, and an input/output interface 318. Microinstruction code 310, for instance a reduced instruction set, may also be included on the platform 304. Various peripheral components may be connected to the computer platform 304 including a graphical interface or terminal 326, a data storage device 330, and a printing device 334. An operating system 308 coordinates the operation of the various components of the computer system 300. An example of computer system 300 like this is the IBM RISC System/6000 (RISC System/6000 is a trademark of the IBM Corporation.) It is readily understood that those skilled in the computer arts will be familiar with many equivalent computer systems 300.

FIG. 4 is a flow chart showing the steps of the smoothing algorithm 400 run by the computer system 300.

Figure 5A:
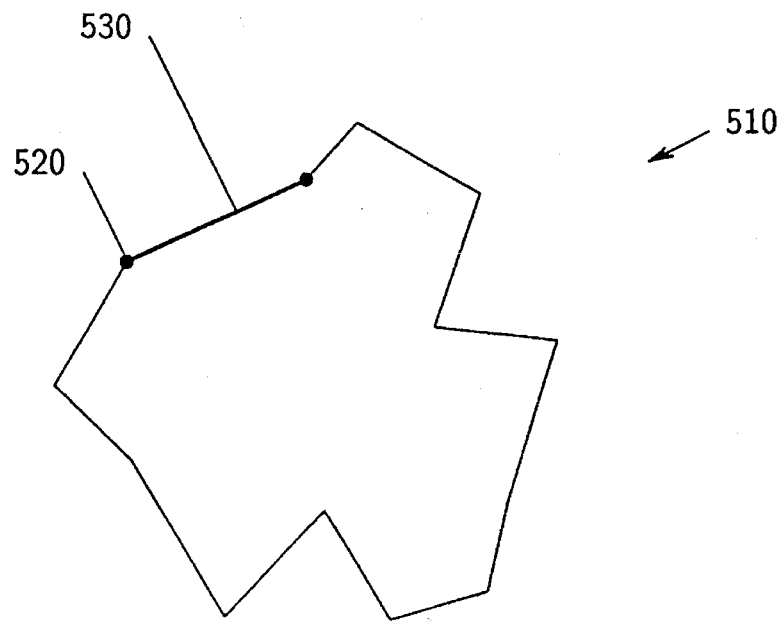
FIG. 5A and FIG. 5B, is a diagram of a piece-wise linear curve (FIG. 5A), and of a piece-wise linear surface (FIG. 5B), showing their defining parts.
Figure 5B:
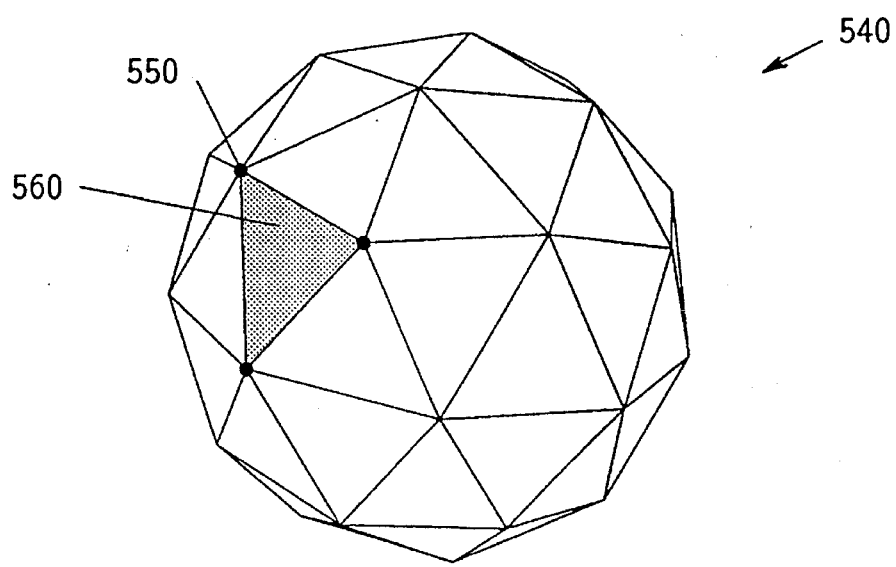

FIGS. 5A and 5B are diagrams of a piece-wise linear curve 510, and a piece-wise linear surface 540, respectively, showing their defining parts. In step 410 the set of vertices $V=\{v_i:i=1,2,\ldots,n_v\}$ of the input piece-wise linear shape 405 to be smoothed is determined. For a two-dimensional curve a vertex 520 is a two-dimensional vector $v_i=(x_i, y_i)$, while for a surface (also for a three-dimensional curve), a vertex 550 is a three-dimensional vector $v_i=(x_i, y_i, z_i)$. The preferred means of representing a piece-wise linear curve 510 is as a pair of lists C={V,E}, the list of vertices V described above, and a list of edges $E=\{e_k:k=1,2,\ldots,n_E\}$, with each edge 530 $e_k=(i_1^k, i_2^k)$ being a pair of different indices of vertices (i is the index of vertex $v_i$). The preferred means of representing a piece-wise linear surface 540 is as a pair of lists S={V,F}, the list of vertices V described above, and a list of faces $F=\{f_k:k=1,2,\ldots,n_F\}$, with each face 560 $f_k=(i_1^k,\ldots,i_{n_{fk}}^k)$ being a sequence of non-repeated indices of vertices, and representing itself a closed three dimensional polygon, not necessarily flat. In some cases, the number of vertices $n_{fk}$ varies from face to face, while in others all the faces have the same number of vertices. Triangulated surfaces are the most common, where all the faces are triangles $f_k=(i_1^k, i_2^k, i_3^k)$.

Figure 6A:
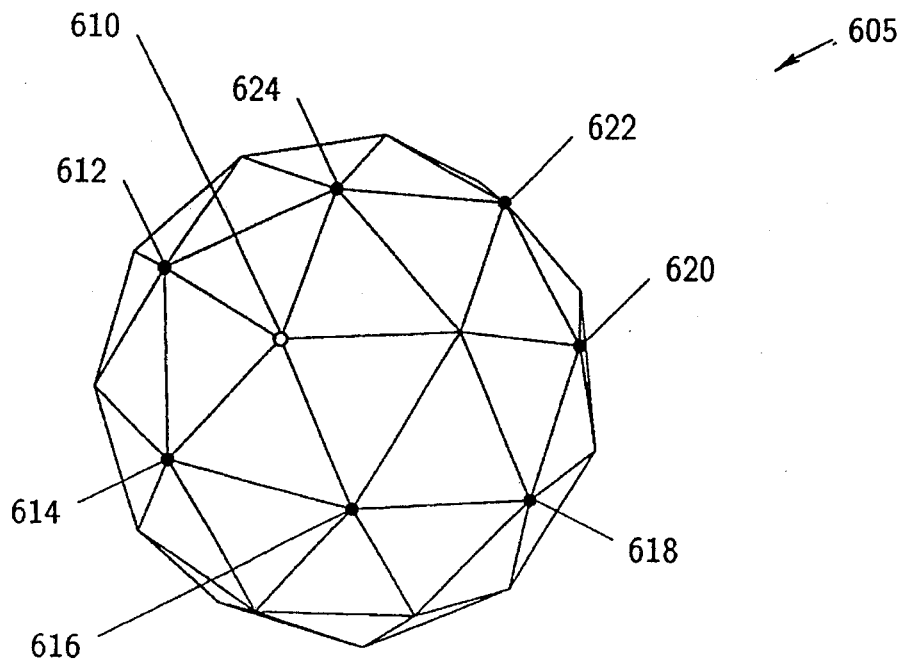
FIGS. 6A and 6B, is a diagram that shows a typical neighborhood (FIG. 6A), and a typical first order neighborhood (FIG. 6B) of a vertex of a piece-wise linear surface.
Figure 6B:
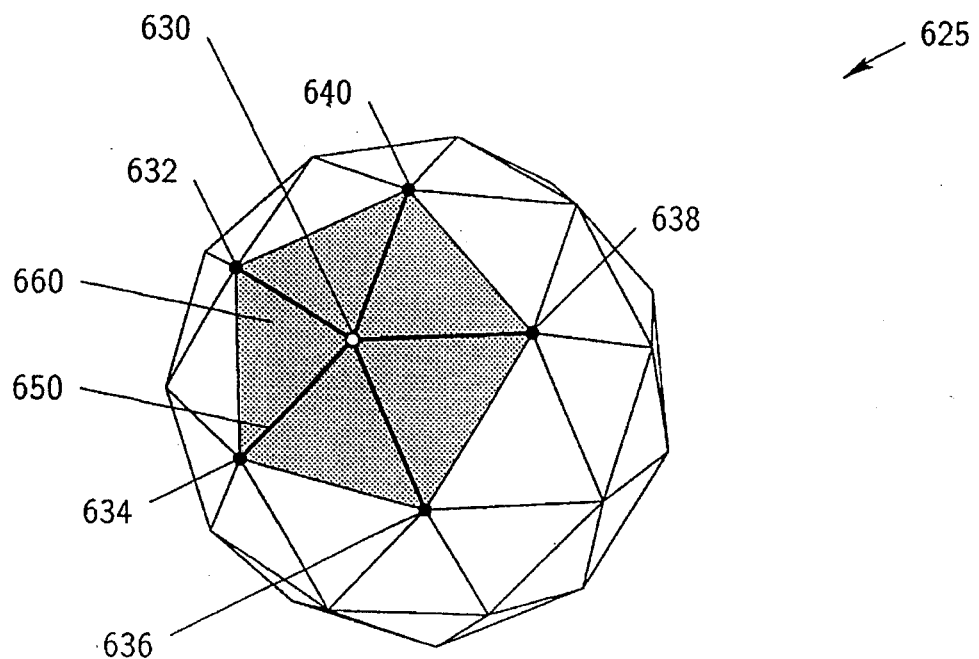

In step 420 a neighborhood of vertices is determined for each vertex $v_i$ describing the input piece-wise linear shape 405. FIG. 6A is a diagram that shows a typical neighborhood of a vertex 610 of a piece-wise linear surface 605. The preferred means of representing the neighborhood of a vertex 610 $v_i$ is by a set i★ of indices of vertices. If the index j belongs to the neighborhood i★, we say that $v_j$ is a neighbor of $v_i$. In FIG. 6A, the neighbors of vertex 610 are the vertices 612,614,616,618,620,622, and 624. No vertex is allowed to be a neighbor of itself, but otherwise no further restrictions are imposed on the neighborhoods. In particular, it is permitted that a vertex $v_j$ be a neighbor of vertex $v_i$ without vertex $v_i$ being a neighbor of vertex $v_j$. A neighborhood structure is symmetric if the situation just described never happens, i.e., every time that a vertex $v_j$ is a neighbor of vertex $v_i$, also $v_i$ is a neighbor of $v_j$. It is allowed that the neighborhood i★ of a vertex $v_i$ be the empty set. The neighborhood structure for the shape 405 is defined as the family of all the neighborhoods $\{i★:i=1,2,\ldots,n_v\}$. The preferred choice of neighborhood structure is the first order neighborhood structure, where for each pair of vertices $v_i$ and $v_j$ that share an edge (or face), we make $v_j$ a neighbor of $v_i$, and $v_i$ a neighbor of $v_j$. The first order neighborhood structure is symmetric. FIG. 6B is a diagram that shows the first order neighborhood of a vertex 630 of a piece-wise linear surface 625. In FIG. 6B, the first order neighbors of vertex 630 are the vertices 632, 634, 636, 638, and 640, which share an edge 650 or face 660 with vertex 630.

In step 430 a first scale factor and a second scale factor of opposite signs are defined, with the magnitude of the negative scale factor greater than the magnitude of the positive scale factor. In a preferred embodiment the first scale factor $\lambda$ is positive and the second scale factor $\mu$ is negative (i.e. $0<\lambda<-\mu$). For ease of explanation, this non-limiting embodiment will be carried through the remainder of the application.

The smoothing core 435 is composed of steps 440, 450, 460, 470, and 475. The smoothing core is executed a certain number of times until the smoothness criterion 480 is satisfied. In a preferred embodiment the scale factors are permitted to change from one iteration to the next of the smoothing core. In another preferred embodiment the scale factors are permitted to change from vertex to vertex of the piece-wise linear shape. In another preferred embodiment the scale factors change from one iteration to the next of the smoothing core and from vertex to vertex of the piece-wise linear shape.

Figure 7A:
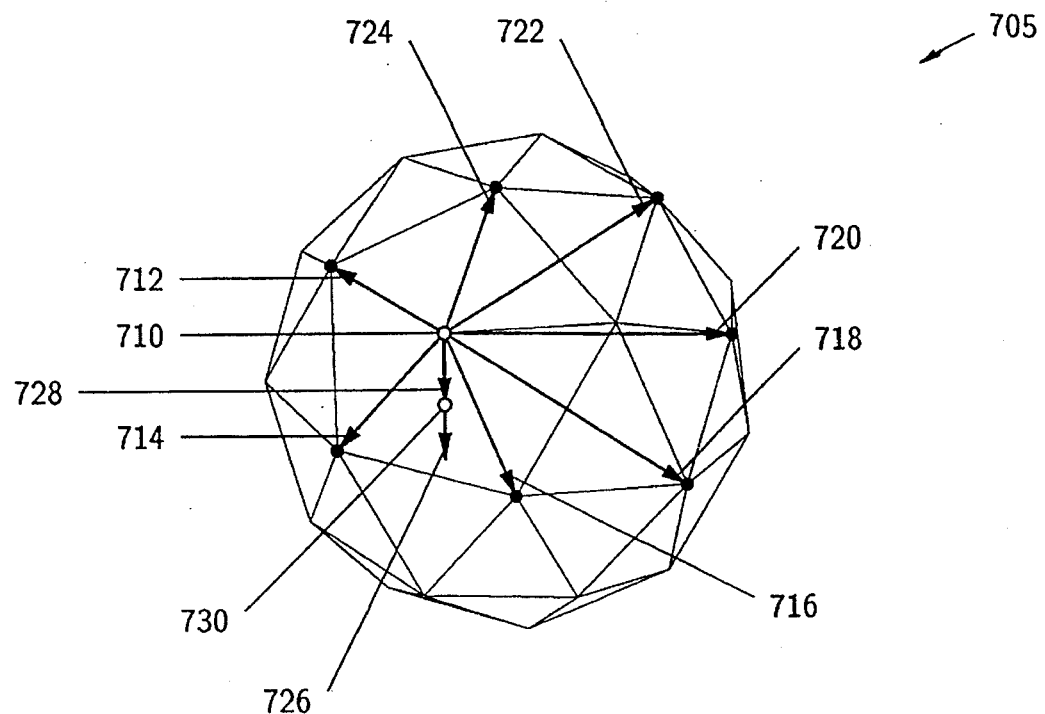
FIGS. 7A and 7B, is a diagram that shows the first vector average, the first vector displacement, the first position (FIG. 7A), the second vector average, the second vector displacement, and the second position of a vertex (FIG. 7B) of a piece-wise linear shape.

In step 440 the first vector averages and the first vector displacements are determined for all the vertices of the piece-wise linear shape. FIG. 7A is a diagram that shows the first vector average 726 and the first vector displacement 728 of a vertex of a piece-wise linear shape 705 which has all its vertices in their current position. If the neighborhood i★ of vertex $v_i$ is empty, the first vector average 726 $\Delta v_i$ of vertex $v_i$ is set equal to the zero vector. Otherwise, the first vector average 726 $\Delta v_i$ of vertex $v_i$ is determined as the average of the first vectors 712, 714, 716, 718, 720, 722, and 724 $v_j-v_i$ that extend from the current position 710 of vertex $v_i$ to the current position of a neighbor vertex $v_j$. The first vector displacement 728 $\lambda\Delta v_i$ of vertex $v_i$ is determined by multiplying the first vector average 726 $\Delta v_i$ by the first scale factor $\lambda$.

In this context, the vector average 726 is determined by dividing the vector sum of the first vectors (above) by the number of vectors in the neighborhood i★. In an alternative embodiment, the vector average 726 is mere the vector sum.

In step 450 the first vertex positions are determined for all vertices of the piece-wise linear shape. FIG. 7A also shows the first vertex position 730 of vertex $v_i$. The first vertex position 730 $v'_i=v_i+\lambda\Delta v_i$ of vertex $v_i$ is determined by moving the vertex from its current position 710 by the first displacement vector 728 $\lambda\Delta v_i$. If the neighborhood of the vertex is empty, the first vector displacement is zero and the first position of the vertex is equal to its current position.

Figure 7B:
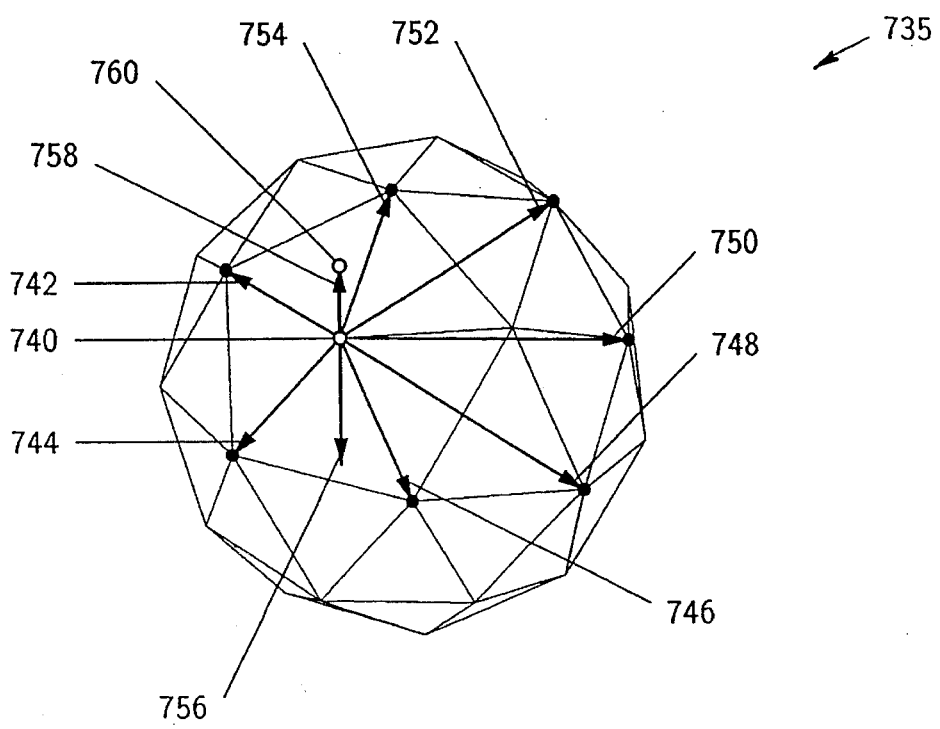

In step 460 the second vector averages and the second vector displacements are determined for all the vertices of the piece-wise linear shape. FIG. 7B is a diagram that shows the second vector average 756 and the second vector displacement 758 of a vertex of a piece-wise linear shape 735. If the neighborhood i★ of vertex 710 $v_i$ is empty, the first vector average 756 $\Delta v_i$ is set equal to the zero vector. Otherwise, the second vector average 756 $\Delta v'_i$ of vertex $v_i$ is determined as the average of the second vectors 742, 744, 746, 748, 750, 752, and 754 $v'_j-v'_i$ that extend from the first position 740 of vertex $v_i$ to the first position of a neighbor vertex $v_j$. The second vector displacement 758 $\mu\Delta v'_i$ of vertex $v_i$ is determined by multiplying the second vector average 756 $\Delta v'_i$ by the second scale factor $\mu$.

As before, the vector average 756 is determined by dividing the vector sum of the second vectors (above) by the number of vectors in the neighborhood i★. In an alternative embodiment, the vector average 756 is mere the vector sum.

Note that because the scale factors are of opposite signs, the first vector displacement 728 and the second vector displacement 758 are in approximate opposite directions. In this manner, the vertex (710, 740) moves forward and back through its final position and therefore the overall smoothed shape 735 does not shrink.

Further note that the present invention can be applied to N-dimensional objects or polytopes. This is done by defining the neighborhoods and the neighbor vertices/vectors in the N-dimensional space.

In step 470 the second vertex positions are determined for all vertices of the piece-wise linear shape. FIG. 7B also shows the second vertex position 760 of vertex $v_i$. The second vertex position 760 $v''_i = v'_i + \mu \Delta v'_i$ of vertex $v_i$ is determined by moving the vertex from its first position 740 by the second displacement vector 758 $\mu \Delta v'_i$. If the neighborhood of the vertex is empty, the second vector displacement is zero, and the second position is equal to its current position.

By assigning no neighbors to a vertex, the vertex position does not change throughout the smoothing algorithm 400. Vertices like this can be used as boundary conditions or as constraints in surface or curve smoothing.

In step 475 the current position of each vertex is established as its respective second position.

In step 480 the smoothness criterion is evaluated. If the smoothness criterion is not satisfied, the algorithm loops back to the beginning of the smoothing core 435. Otherwise, the algorithm terminates in step 490 outputting the resulting smoothed shape.

Figure 9:
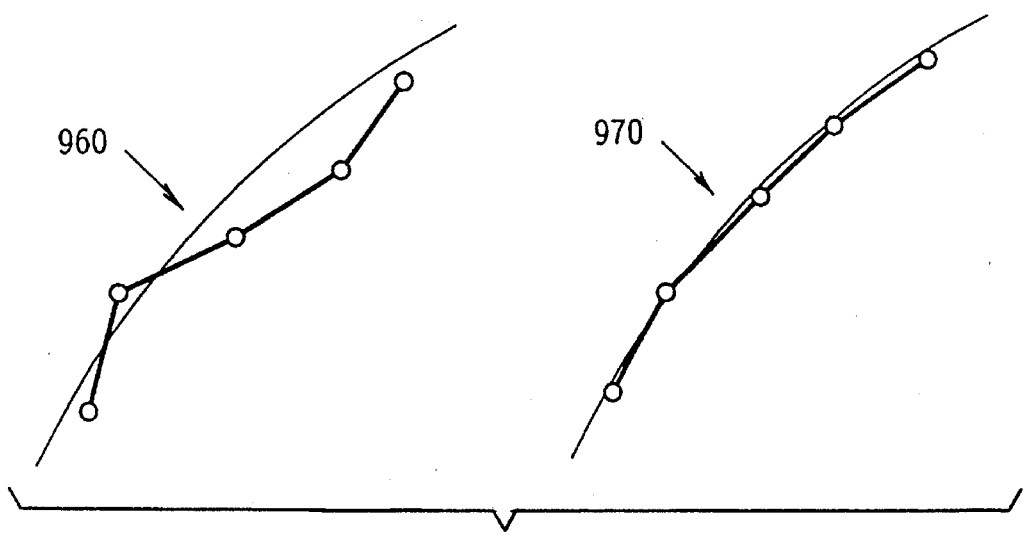
FIG. 9 is a diagram that shows a piece-wise linear shape not satisfying the smoothness criterion, and satisfying the smoothness criterion.

FIG. 9 is a diagram that shows a piece-wise linear shape 960 not satisfying the smoothness criterion, and satisfying the smoothness criterion 970.

Figure 8:
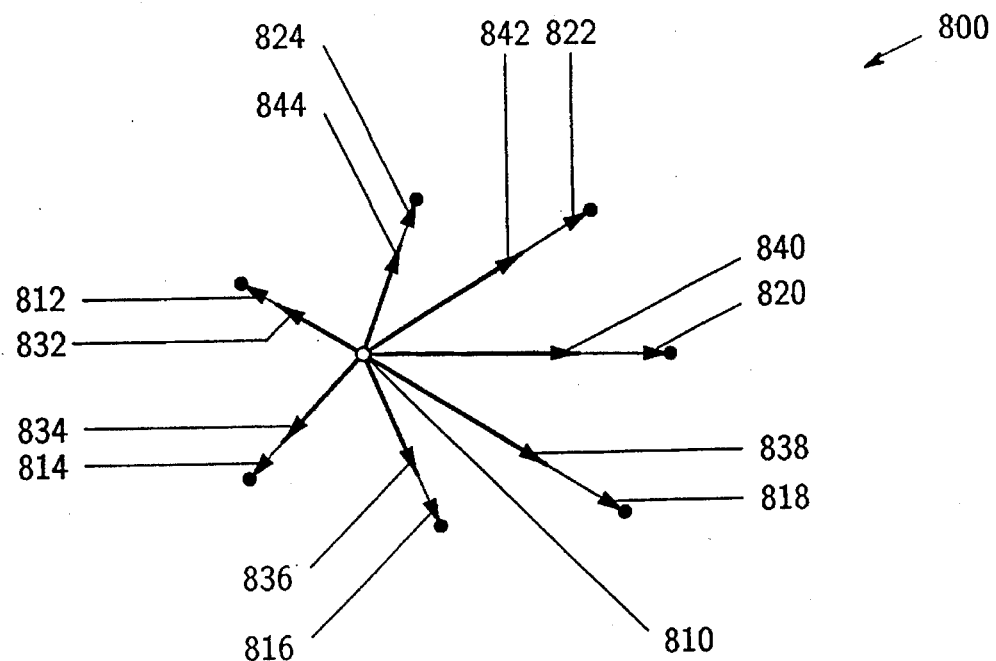
FIG. 8 is a vector diagram showing one preferred embodiment that weights neighbor vectors.

In a preferred embodiment the first (second) vector average of a vertex $v_i$ is determined as the weighted average of the first (second) vectors $v_j - v_i$ weighted by the respective neighbor weights $w_{ij}$. This may or may not be divided by the sum of the weights. In a more preferred embodiment, the neighbor weights are all positive and for each vertex, the sum of all its neighbor weights is equal to the value 1. FIG. 8 is a diagram that shows a neighborhood of a vertex 810 $v_i$ where the first vectors 832, 834, 836, 838, 840, 842, and 844 are determined by weighting the vectors 812, 814, 816, 818, 820, 822, and 824, respectively. In alternative embodiments, the weights can change from iteration to iteration of the smoothing core 435.

In a preferred embodiment, the smoothness criterion 480 is met when the smoothing core 435 has been executed a certain number of times N. FIG. 10 shows the flow chart of FIG. 4 modified to incorporate this preferred smoothness criterion. (Note that reference numerals for steps that have identical functions are the same as in FIG. 4.) The number of iterations 1010 N of the smoothing core are determined before executing the smoothing core for the first time. The algorithm finishes when the number of iterations reaches the value N 1020.

In a more preferred embodiment, the first scale factor $\lambda$, the second scale factor $\mu$, (see 430) and the number of iterations N are computed as functions of the low-pass filter parameters. FIG. 11B is a diagram that shows the low-pass filter transfer function 1050, and the low-pass filter parameters. The low-pass filter parameters are the pass-band curvature 1060 $\kappa_{PB}$, the pass-band ripple 1070 $\kappa_{PB}$, the stop-band curvature 1080 $\kappa_{SB}$, and the stop-band ripple 1090 $\kappa_{SB}$. The low-pass filter parameters must satisfy the constraints [100], [110], and [120].

$$0 < \kappa_{PB} < \kappa_{SB} \qquad [100]$$

$$0 < \delta_{PB} \qquad [110]$$

$$0 < \delta_{SB}. \qquad [120]$$

Figure 12:
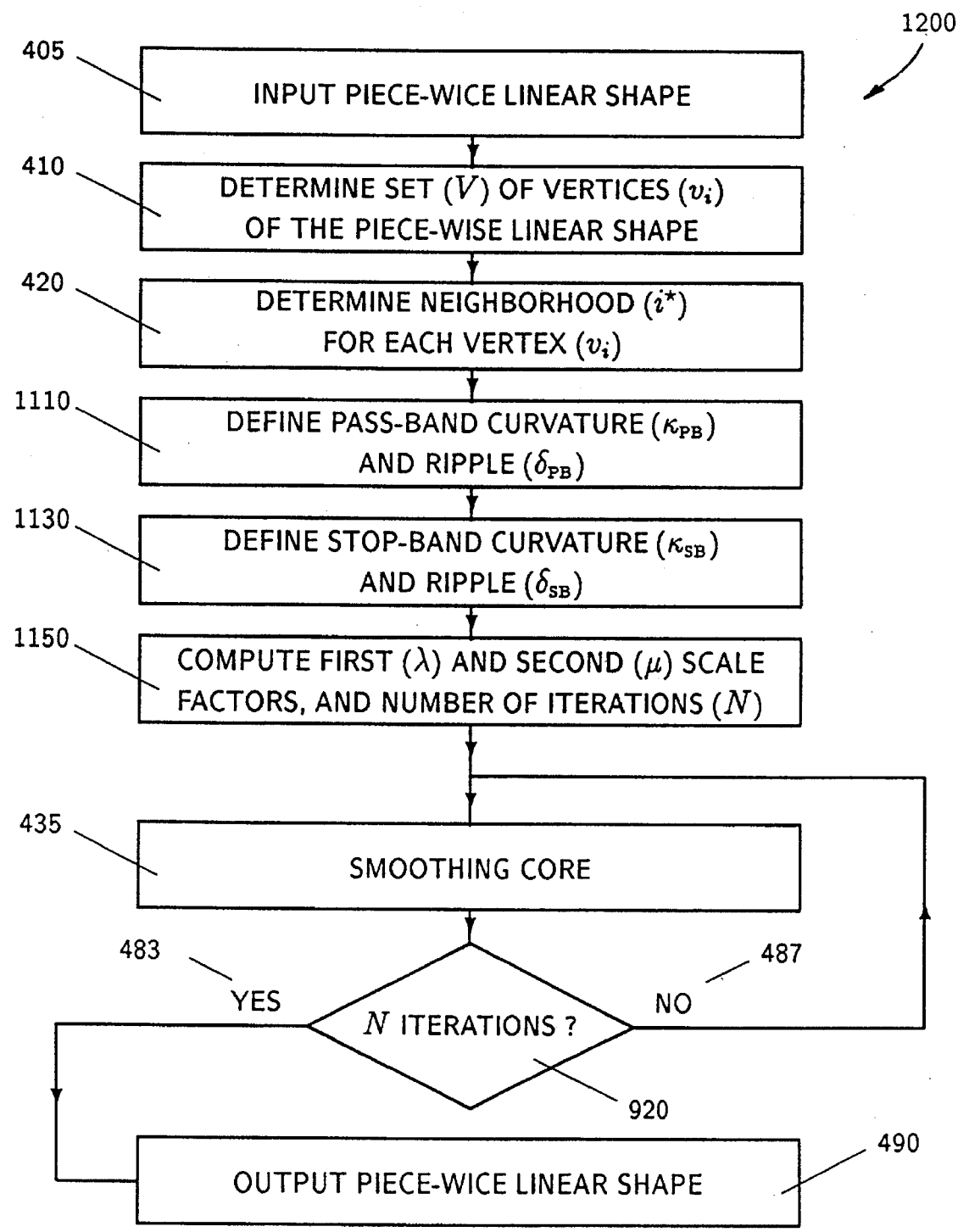
FIG. 12 is a flow chart showing the steps of the present smoothing algorithm in a more preferred embodiment of the smoothness criterion.

FIG. 12 shows the flow chart of FIG. 10 modified to incorporate this preferred smoothness criterion. Reference numerals for steps that have identical functions are the same as in FIGS. 4 and 10. In step 1110 the pass-band curvature and the pass-band ripple are defined. In step 1130 the stop-band curvature and the stop-band ripple are defined. In step 1150 the first scale factor, the second scale factor, and the number of iterations are computed as functions of the low-pass filter parameters. The first scale factor $\lambda$, the second scale factor $\mu$, and the number of iterations N are computed from the low-pass filter parameters as a solution of the system of equations and inequalities [200], [210], [220], [230], [240], and [250].

$$0 < N \qquad [200]$$

$$0 < \lambda < -\mu \qquad [210]$$

$$\lambda < \frac{1}{\kappa_{SB}} \qquad [220]$$

$$\frac{1}{\lambda} + \frac{1}{\mu} = \kappa_{PB} \qquad [230]$$

$$\left( \frac{(\lambda - \mu)^2}{-4\lambda\mu} \right)^N \leq 1 + \delta_{PB} \qquad [240]$$

$$((1 - \lambda\kappa_{SB})(1 - \mu\kappa_{SB}))^N \leq \delta_{SB} \qquad [250]$$

If this system admits more than one solution, the solution corresponding to the minimum value of N is chosen, to minimize the computation time. A detailed discussion of the derivation of these equations is given in the Appendix.

Figure 13:
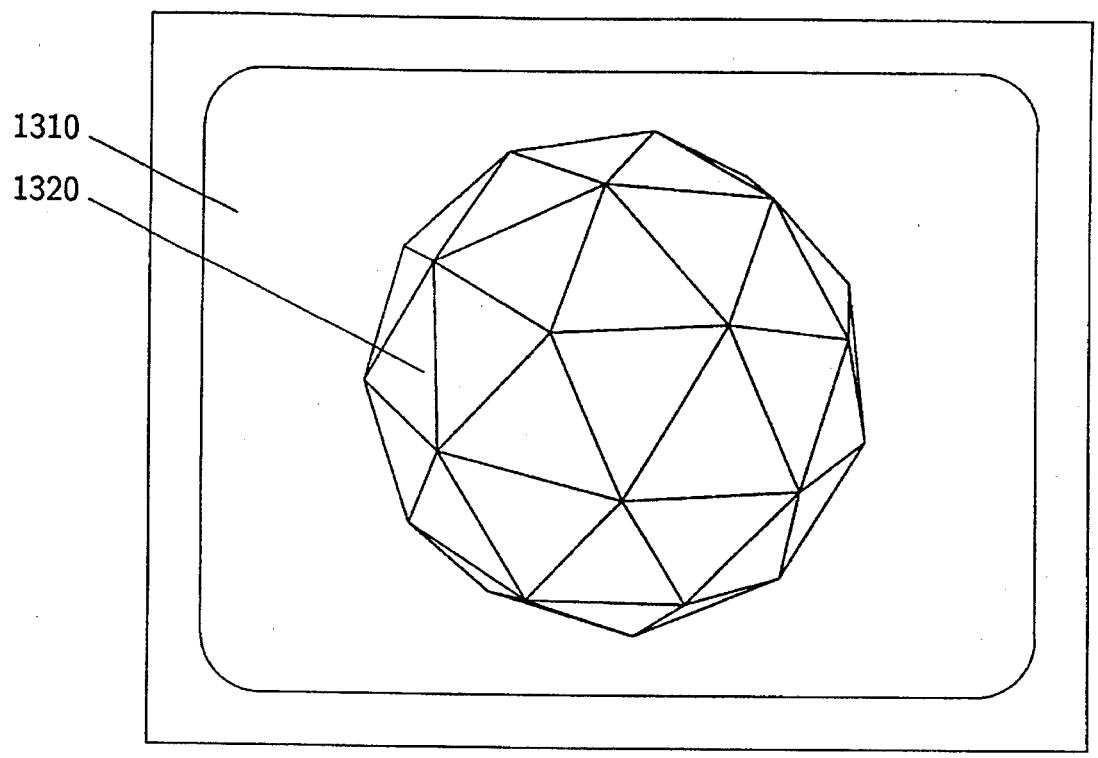
FIG. 13 is a diagram of a piece-wise linear shape generated on a computer graphical display by the present invention.

In a preferred embodiment, the invention can be used to generate images of piece-wise linear shapes. FIG. 13 is a diagram that shows an image 1320 of a piece-wise linear shape being displayed in a computer terminal 1310.

Is it understood that other embodiments are possible that incorporate the principles of the invention and that the above disclosure is merely illustrative of such principles and is not intended to be limiting in any respect. For example, applications of the invention include, but are not restricted to: smoothing piece-wise linear approximation of smooth curves and surfaces such as those produced by iso-surface construction algorithms, smoothing curves and surfaces as a preprocessing step within an object recognition system, smoothing surfaces of molecules within a drug design system, and smoothing curves and surfaces designed within a computer aided geometric design system.

APPENDIX

To determine the equations that relate the low-pass filter parameters and the first scale factor, the second scale factor, and the number of iterations of the smoothing core, it is necessary to find an analytic expression for the final positions of the vertices of the shape as a function of the initial positions of the corresponding vertices, and of the first scale factor, the second scale factor, and the number of iterations of the smoothing core.

For a two-dimensional shape, let X be the $n_v \times 2$ matrix with i-th row equal to the coordinates $(x_i, y_i)$ of current position of vertex $v_i$. For a three-dimensional shape, let X be the $n_v \times 3$ matrix with i-th row equal to the coordinates $(x_i, y_i, z_i)$ of the current position of vertex $v_i$. Let X' and X'' be matrices constructed in the same way, but with the coordinates of the first and second positions of the vertices, respectively. And let $X^N$ be yet another matrix constructed in the same way, but with the coordinates of the current position of the vertices when the algorithm stops, after the smoothing core 435 is executed N times.

The relation between the matrices X and X' can be described in matrix form as $$X'=(I-\lambda K)X,$$

where $\lambda$ is the first scale factor, K is the square $n_v \times n_v$ matrix $K=I-W$, I is the $n_v \times n_v$ identity matrix, and W is the square $n_v \times n_v$ matrix with elements $\{w_{ij}: i,j=1,2,\ldots,n_v\}$ defined as follows.

For each index $i=1,2,\ldots,n_v$, and for each index $j=1,2,\ldots,n_v$, the element $w_{ij}$ is equal to 0 if vertex $v_j$ is not a neighbor of vertex $v_i$, and Otherwise, if the neighborhood i★ of vertex $v_i$ has |i★| elements, for each neighbor $v_j$ of vertex $v_i$, $w_{ij}$ is equal to the inverse 1/|i★| of the number of neighbors of $v_i$.

Similarly, the relation between the matrices X' and X" can be described in matrix form as $$X'=(I-\mu K)X,$$

where $\mu$ is the second scale factor, and K is the same matrix described above.

Since the matrices $I-\lambda K$ and $I-\mu K$ commute with each other, the relation between the position of the vertices before and after the smoothing core 435 is executed N times can be described in matrix form as $$X^N=((I-\mu K)(I-\lambda K))^N X.$$

When the neighborhood structure is symmetric, the matrix K defined above has all real non-negative eigenvalues, and sets of left and right eigenvectors that form respective bases of $n_v$-dimensional space. Let $0 \leq \kappa_1 \leq \kappa_2 \leq \ldots \leq \kappa_{n_v}$ be the eigenvalues of the matrix K, and let $f(\kappa)$ be the polynomial of one variable $\kappa$ defined by $$f(\kappa)=(1-\lambda\kappa)(1-\mu\kappa).$$

Polynomials of one variable can be evaluated in square matrices. In particular the matrix $((I-\mu K)(I-\lambda K))^N$ can be written as the evaluation $f(K)^N$ of the polynomial $f(\kappa)^N$ in the matrix K. If $u_1, u_2, \ldots, u_{n_v}$ is a set of linearly independent unit length right eigenvectors of the matrix K associated with the eigenvalues $\kappa_1, \kappa_2, \ldots, \kappa_{n_v}$, respectively, then $u_1, u_2, \ldots, u_{n_v}$ are also right eigenvectors of the matrix $f(\kappa)^N$, with associated eigenvalues $f(\kappa_1)^N, \ldots, f(\kappa_{n_v})^N$. Furthermore, since $u_1, u_2, \ldots, u_{n_v}$ constitute a basis of $n_v$-dimensional space, each column vector x of the matrix X (the vectors of first, second, or third coordinates of the vertices of the piece-wise linear shape) can be written in a unique way as a linear combination of the basis vectors $$x=\xi_1 u_1+\ldots+\xi_{n_v} u_{n_v},$$

where $\xi_1, \ldots, \xi_{n_v}$ are constants, and so $$f(K)^N x=f(\theta_1)^N \xi_1 u_1+\ldots+f(\kappa_n)^N \xi_{n_v} u_{n_v}.$$

Figure 11A:
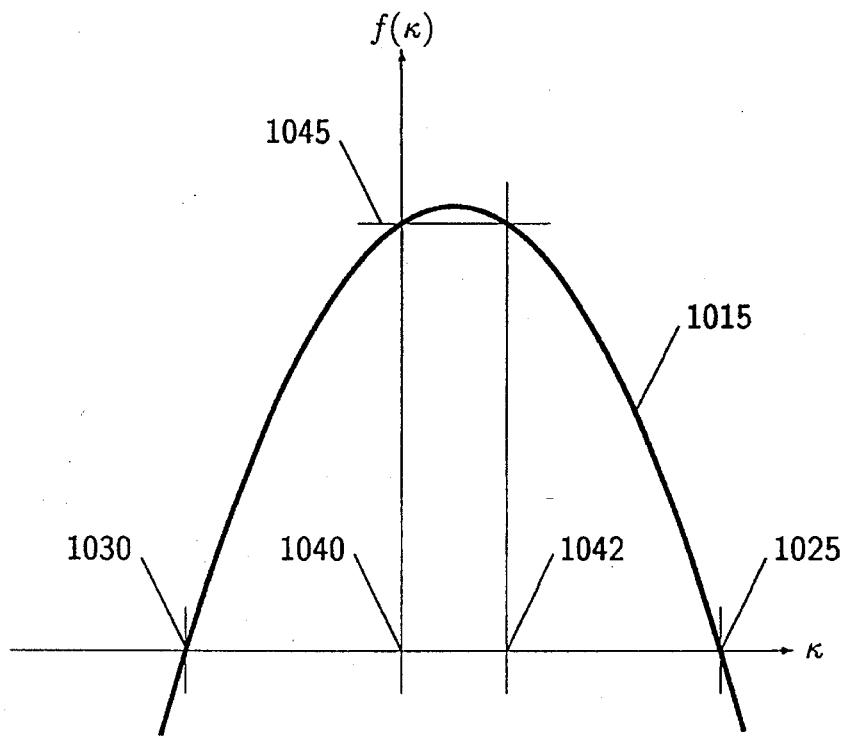
FIGS. 11A and 11B is a diagram that showing the curvature low-pass filter transfer function and the curvature low-pass filter parameters of the smoothing core (FIG. 11A), and of the whole algorithm (FIG. 11B).
Figure 11B:
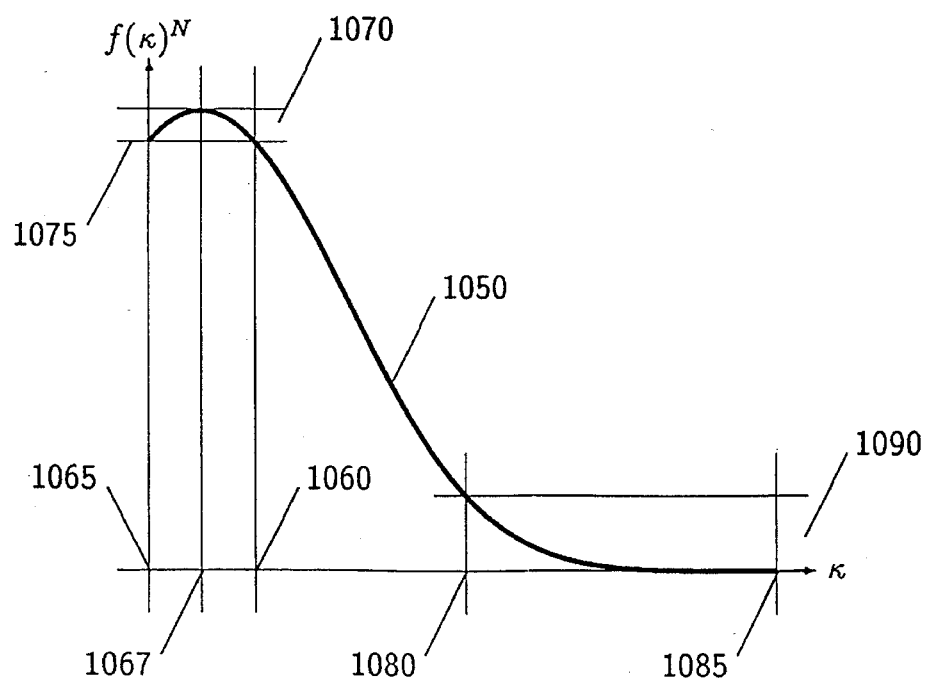

FIG. 11A is a diagram that shows the graph of the polynomial $f(\kappa)$. FIG. 11B is a diagram that shows the transfer function 1050 of the low-pass filter. The transfer function 1050 shown in FIG. 11B is the graph of the function $f(\kappa)^N$. The graph 1015 of the polynomial $f(\kappa)$ is an inverted parabola with roots at 1025 $\kappa=1/\lambda \leq 0$ and 1030 $\kappa=1/\mu<0$. The value of the polynomial $f(\kappa)$ is positive for $1/\mu<\kappa<1/\lambda$, and negative for $\kappa<1/\mu$ and $\kappa>1/\lambda$. Furthermore, since for 1040 $\kappa=0$ we have 1045 $f(\kappa)=1$, and since in the preferred embodiment $\mu+\lambda<0$, there is another value of $\kappa$, let us denote it 1042 $\kappa_{PB}$, such that $f(\kappa_{PB})=1$. The value of $\kappa_{PB}$ is $$\kappa_{PB}=\frac{1}{\lambda}+\frac{1}{\mu}=-\frac{\mu+\lambda}{\mu\lambda}>0.$$

The graph 1050 of the function $f(\kappa)^N$ displays a typical low-pass filter shape in the region of interest, i.e., from 1065 $\kappa=0$ to 1085 $\kappa=1/\lambda$. The pass-band region extends from 1065 $\kappa=0$ to 1060 $\kappa=\kappa_{PB}$. For values of $\kappa$ in the pass-band region, $f(\kappa)^N$ stays almost unchanged above the value 1075 one. The transition region extends from 1060 $\kappa=\kappa_{PB}$ to 1080 $\kappa=\kappa_{SB}$. The stop-band region extends from 1080 $\kappa=\kappa_{PB}$ to 1085 $\kappa=1/\lambda$. For values of $\kappa$ in the stop-band region, $f(\kappa)^N$ converges to 0 as N grows.

Regarding the eigenvalues of the matrix K, if the magnitude of the number $f(\kappa_i)$ is significantly less than 1, i.e., when $\kappa_i$ is greater than the stop-band curvature $\kappa_{SB}$, then $f(\kappa_i)^N$ is very close to 0 for large N. And if the magnitude of $f(\kappa_i)$ is close 1, i.e., when $\kappa_i$ is not greater than the pass-band curvature $\kappa_{PB}$, then $f(\kappa_i)^N$ is also close to 1 for large N.

To determine the first scale factor $\lambda$, the second scale factor $\mu$, and the number of iterations N as functions of the pass-band curvature $\kappa_{PB}$, the pass-band ripple $\kappa_{PB}$, the stop-band curvature $\kappa_{SB}$, and the stop-band ripple $\delta$, we first observe that, based on the previous discussion, these parameters must satisfy the equalities and inequalities [100], [120], [200], [210], [220], and [230]. In equality [240] corresponds to the fact that the transfer function should not be greater than the pass-band ripple plus one $1+\delta_{PB}$ in the pass-band region. This is so because the transfer function $f(\kappa)^N$ attains its maximum value $$\left(\frac{(\lambda-\mu)^2}{-4\lambda\mu}\right)^N$$

at the mean point 1067 of the pass-band region. Inequality [250] establishes the fact that the transfer function should not be greater than the stop-band ripple in the stop-band region. And this is so because the transfer function attains its maximum value in the stop-band region at the stop-band curvature.

I claim:

1. A computer implemented method for smoothing a piece-wise linear shape represented on a computer as a set of vertices, comprising the computer implemented steps of:

a. determining a neighborhood associated with each vertex, each neighborhood comprising a subset of zero or more neighbor vertices from the set of vertices such that the vertex is not included in its neighborhood;

b. describing a first and a second scale factor of opposite signs, the negative scale factor being of greater magnitude than the positive scale factor;

c. determining a first vector displacement for each vertex, the first vector displacement being the first scale factor times a first vector average, the first vector average being the average of all of the zero or more neighbor vectors, each neighbor vector being a vector from the vertex to each of its neighbor vertices, all the vertices being at a respective current position;

d. determining a first position of each vertex, the first position being the position of the vertices moved by their first vector displacement from their current position, respectively;

e. determining a second vector displacement for each vertex, the second vector displacement being the second scale factor times a second vector average, the second vector average being of the average of all of zero or more second neighbor vectors, each second neighbor vector being a vector from the vertex to each of the neighbor vertices, all vertices being at their respective first position, respectively;

f. determining a second position of each vertex, the second position being the position of the vertices moved by their respective second vector displacement from their first position, respectively;

g. establishing the current position of each vertex as its respective second position; and h. if the shape defined by the vertices in their second position does not meet a smoothness criteria, repeating steps c through h until the smoothness criteria is met.

2. A method, as in claim 1, where the neighborhood vectors are in the direction from the neighbor vertices to the vertex and the positive scale factor is greater in magnitude than the negative scale factor.

3. A method for smoothing, as in claim 1, where the shape is a curve.

4. A method for smoothing, as in claim 1, where the shape is surface.

5. A method for smoothing, as in claim 1, where the vector average is vector sum.

6. A method, as in claim 1, where the scale factors are iteration-dependent.

7. A method, as in claim 1, where the scale factors are vertex-dependent.

8. A method, as in claim 1, where the scale factors are iteration-dependent and vertex-dependent.

9. A computer implemented method for smoothing a piece-wise linear shape modeled by a computer as a set of vertices, comprising the computer implemented steps of:

a. determining a neighborhood associated with each vertex, each neighborhood comprising a subset of zero or more neighbor vertices from the set of vertices such that the vertex is not included in its neighborhood;

b. describing a first and a second scale factor of opposite signs, the negative scale factor being of greater magnitude than the positive scale factor;

c. determining a first vector displacement for each vertex, the first vector displacement being the first scale factor times a first vector average, the first vector average being the weighted average of all of zero or more neighbor vectors, each neighbor vector being a vector from the vertex to each of its neighbor vertices and weighted by its respective neighbor weight, all the vertices being at a respective current position;

d. determining a first position of each vertex, the first position being the position of the vertex moved by its first vector displacement from its current position, respectively;

e. determining a second vector displacement for each vertex, the second vector displacement being the second scale factor times a second vector average, the second vector average being the weighted average of all of the zero or more second neighbor vectors, each second neighbor vector being a vector from the vertex to each of the neighbor vertices and weighted by its respective neighbor weight, all vertices being at their respective first position, respectively;

f. determining a second position of each vertex, the second position being the position of the vertex moved by the second vector displacement from its first position, respectively;

g. if the shape defined by the vertices in their second position does not meet a smoothness criteria, establishing the current position of each vertex as its respective second position and repeating steps c through g until the smoothness criteria is met.

10. A method of smoothing, as in claim 9, where all the neighbor weights are positive numbers with all the neighbor weights in each neighborhood summing to the value one.

11. A method of smoothing, as in claim 9, where the vertices meeting the smoothness criteria define an image of a smoothed shape that is displayed on a graphical interface.

12. A method, as in claim 9, where the piece-wise linear shape is a polytope of arbitrary dimension.

13. A method, as in claim 9, where the weights are pre-specified and are kept unchanged throughout all the steps.

14. A method, as in claim 9, where the weights change during one or more iterations.

15. A method, as in claim 9, where the weighted average is a sum.

16. A computer implemented method for smoothing a piece-wise linear shape comprising the steps of:

a. determining a set of a plurality of vertices describing the shape;

b. determining a neighborhood associated with each vertex, each neighborhood comprising a subset of zero or more neighbor vertices from the set of vertices such that the vertex is not included in its neighborhood;

c. describing a first and a second scale factor of opposite signs, the negative scale factor being of greater magnitude than the positive scale factor;

d. describing a number of iterations;

e. determining a first vector displacement for each vertex, the first vector displacement being the first scale factor times a first vector average, the first vector average being the average of all of zero or more neighbor vectors, each neighbor vector being a vector from the vertex to each of its neighbor vertices, all the vertices being at a respective current position;

f. determining a first position of each vertex, the first position being the position of the vertices moved by their first vector displacement from their current position, respectively;

g. determining a second vector displacement for each vertex, the second vector displacement being the second scale factor times a second vector average, the second vector average being of the average of all of zero or more second neighbor vectors, each second neighbor vector being a vector from the vertex to each of the neighbor vertices, all vertices being at their respective first positions;

h. determining a second position of each vertex, the second position being the position of the vertices moved by their respective second vector displacement from their first position, respectively;

i. establishing the current position of each vertex as its respective second position; and j. if the number of times that steps e to i have been executed is less than the number of iterations, repeating steps d through i until the smoothness criteria is met.

17. A computer implemented method for smoothing a piece-wise linear shape comprising the steps of:

a. determining a set of a plurality of vertices describing the shape;

b. determining a neighborhood associated with each vertex, each neighborhood comprising a subset of zero or more neighbor vertices from the set of vertices such that the vertex is not included in its neighborhood;

c. describing a pass-band curvature $\kappa_{PB}$, a pass-band ripple $\delta_{PB}$, a stop-band curvature $\kappa_{SB}$, and a stop-band ripple $\delta_{SB}$, such that $0<\kappa_{PB}<\kappa_{SB}$, $0<\delta_{PB}$, and $0<\delta_{SB}$;

d. computing the first scale factor $\lambda$, the second scale factor $\mu$, and the number of iterations N by solving the following system of equations and inequalities;

$$0 < N$$

$$0 < \lambda < -\mu$$

$$\lambda < \frac{1}{\kappa_{SB}}$$

$$\frac{1}{\lambda} + \frac{1}{\mu} = \kappa_{PB}$$

$$\left( \frac{(\lambda-\mu)^2}{-4\lambda\mu} \right)^N \leq 1 + \delta_{PB}$$

$$((1 - \lambda\kappa_{SB})(1 - \mu\kappa_{SB}))^N \leq \delta_{SB}$$

If this system admits more than one solution, the solution corresponding to the minimum value of N is chosen;

e. determining a first vector displacement for each vertex, the first vector displacement being the first scale factor times a first vector average, the first vector average being the average of all of zero or more neighbor vectors, each neighbor vector being a vector from the vertex to each of its neighbor vertices, all the vertices being at a respective current position;

f. determining a first position of each vertex, the first position being the position of the vertices moved by their first vector displacement from their current position, respectively;

g. determining a second vector displacement for each vertex, the second vector displacement being the second scale factor times a second vector average, the second vector average being of the average of all of zero or more second neighbor vectors, each second neighbor vector being a vector from the vertex to each of the neighbor vertices, all vertices being at their respective first positions;

h. determining a second position of each vertex, the second position being the position of the vertices moved by their respective second vector displacement from their first position, respectively;

i. establishing the current position of each vertex as its respective second position; and j. if the number of times that steps e to i have been executed is less than the number of iterations, repeating steps e through j.

18. A system for smoothing a piece-wise linear shape comprising:

A. a computer with an operating system, memory, and a central processing unit and graphical interface;

B. an application program executed by the central processing unit for smoothing a piecewise linear shape represented on the computer as a set of vertices, comprising the computer implemented steps of:

a. determining a neighborhood associated with each vertex, each neighborhood comprising a subset of zero or more neighbor vertices from the set of vertices such that the vertex is not included in its neighborhood;

b. describing a first and a second scale factor of opposite signs, the negative scale factor being of greater magnitude than the positive scale factor;

c. determining a first vector displacement for each vertex, the first vector displacement being the first scale factor times a first vector average, the first vector average being the average of all of zero or more neighbor vectors, each neighbor vector being a vector from the vertex to each of its neighbor vertices, all the vertices being at a respective current position;

d. determining a first position of each vertex, the first position being the position of the vertices moved by their first vector displacement from their current position, respectively;

e. determining a second vector displacement for each vertex, the second vector displacement being the second scale factor times a second vector average, the second vector average being of the average of all of zero or more second neighbor vectors, each second neighbor vector being a vector from the vertex to each of the neighbor vertices, all vertices being at their respective first positions;

f. determining a second position of each vertex, the second position being the position of the vertices moved by their respective second vector displacement from their first position, respectively;

g. establishing the current position of each vertex as its respective second position; and h. if the shape defined by the vertices in their second position does not meet a smoothness criteria, repeating steps c through h until the smoothness criteria is satisfied, whereby the shape with the vertices in the current position is rendered on the graphical interface.

* * * * *